United States Patent [19]

McCaskill et al.

[11] 4,434,475

[45] Feb. 28, 1984

[54] METHOD OF ENTERING CRITERIA FOR SELECTING RECORDS OF SPATIALLY RELATED DATA STORED IN AN INTERACTIVE TEXT PROCESSING SYSTEM

[75] Inventors: Rex A. McCaskill; John W. McInroy; Paul D. Waldo, all of Austin, Tex.

[73] Assignee: International Business Machines Corporation, Armonk, N.Y.

[21] Appl. No.: 264,303

[22] Filed: May 18, 1981

[51] Int. Cl.³ .............................................. G06F 3/153
[52] U.S. Cl. ...................................... 364/900; 340/709
[58] Field of Search ............... 340/709, 715, 723, 724, 340/726, 734, 792; 364/200 MS File, 900 MS File, 300; 400/83

[56] References Cited

U.S. PATENT DOCUMENTS

| | | | |
|---|---|---|---|
| 3,582,946 | 6/1971 | Mita | 340/792 X |
| 3,688,275 | 8/1972 | Fredrickson | 364/900 |
| 3,974,493 | 8/1976 | De Cavaignac | 340/709 |
| 4,101,879 | 7/1978 | Kawaji | 340/709 |
| 4,160,981 | 7/1979 | Raney, Jr. | 340/724 X |
| 4,225,943 | 9/1980 | Busch | 364/900 |

*Primary Examiner*—Edward J. Wise
*Attorney, Agent, or Firm*—R. E. Cummins

[57] ABSTRACT

An improved method is disclosed for assisting the operator of an interactive text processing system. The method assists the operator in entering interactively selection criteria to be used in selecting records from the existing file. The improved method involves displaying to the operator the header portion of the existing file, along with a predetermined number of "qualifying rows" in response to the operator having identified to the system the task to be accomplished and the name and the location of the existing file in the system.

The method further involves movement of the cursor vertically and horizontally to row and column positions for entering of the selection criteria. After entering criteria into the displayed rows, the next operation of the cursor down key while in the last row is interpreted as an instruction to the system to add an additional row so that another "logical OR" selection criteria can be added to the previous criteria.

6 Claims, 7 Drawing Figures

METHOD OF ENTERING CRITERIA FOR SELECTING RECORDS OF SPATIALLY RELATED DATA STORED IN AN INTERACTIVE TEXT PROCESSING SYSTEM

DESCRIPTION

1. Technical Field

This invention relates in general to processing of spatially related data in an interactive text processing system and, in particular, to an improved method for entering additional field dependent record selection criteria into a system which affects operator perceived response times to changes in the displayed data.

2. Related Applications

Ser. No. 264,368, filed May 18, 1981, is directed to a method for displaying and editing spatially related data in an interactive text processing system where the spatially related data is stored in vector format and in which one editing process is used for editing both text and file type data.

Ser. No. 264,387, filed May 18, 1981, is directed to an improved method for assisting an operator in defining to the interactive text processing system how spatially related data from an existing file is to be rearranged for display or copying.

3. Prior Art

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which would appear on the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocesor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally transferred to diskette storage either before or after the document has been printed. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key before moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, or moving a word or phrase from one position to another position.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for processing spatially related data. One reason for the different set of programs is that there is an advantage in storing spatially related data in a vector format since this permits data processing type of functions, i.e., sorting of record fields or repositioning of fields, by the microprocessor quite easily. Hence, since the spatially related data is stored differently in the system than text data, the simple type of editing functions which must also be done on the spatially related data have required in the past their own set of programs stored with the microprocessor.

It has been found, that considerable storage space can be saved if the display and editing processes for text data can also be used for displaying and editing data stored in a vector format, as disclosed in copending application Ser. No. 264,368, filed concurrently herewith and assigned to the assignee of the present invention. The display and editing processes for text data in that system are also employed to display and edit the spatially related data by converting a predetermined amount of the vector stored data to text data. The display and editing processes then function as if the spatially related data was really text.

In that system, all of the potential parameters of the spatial relationship of the data or coordinate system are first entered into the text processing system in a conventional query-response mode. The system then displays the header portion of the matrix showing, the field name and vertical field dividers. The system further positions the cursor at the starting position in the upper left corner, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the decoded vector, if the modification is to the actual data. An example of one modification which can be accomplished would be the relocation or repositioning in the matrix of rows in accordance with the data in one column, such as sorting or collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

In addition to the data processing type functions described in the above mentioned application, it is desirable to automatically select records of spatially related data from an existing file where selected files of each record meet selection criteria which have been entered into the system by the operator in an interactive mode.

A limited number of prior art systems provide the operator with the ability to enter selection criteria in an interactive mode. In one known system, the header portion of the file is displayed along with a skeleton of two rows. In that system, the cursor is positioned to the appropriate field and a single criterion entered by the operator. Before another criterion can be ORed with the first criterion, a special function key on the keyboard must be operated to either insert a row following the first row or, if the cursor is in the second row of the display, to add an additional row so that three rows are displayed. That process is repeated until all of the field dependent record selection criteria have been entered or the system reaches a limit where no more criteria are acceptable.

The known system is further described in an article entitled "Query by Example: A Database Language" by M. M. Zloof, published in the *IBM Systems Journal*, No. 4, 1977 beginning on page 324.

In the systems described in the copending applications, a record of spatially related data is stored in the system as a vector, which includes a column vector for each field of the record. Since the width of the display device is only 80 character positions wide and a record could have a maximum of 1,040 character positions, a line on the screen representing a record would "segment" automatically in response to the cursor encountering a new field in, for example, the last 20 character positions of the screen or entering a new field which is not completely displayed. That is, the newly encountered field would be repositioned to the start of the display line so as to display the 20 characters followed by an additional new 60 character positions. This "segmenting" process would be repeated until the last column of the record was displayed as the cursor was moved horizontally across the screen.

As described in that system, the entire record is transferred from diskette storage to a section of memory referred to as the display data area where it is stored in vector format. The microprocessor then converts a slice of the vector stored data to text format data for storing in the display format buffer, which supplies the refresh buffer of the display. The converting of vector formatted data to text data is basically a decoding process which involves a relatively large number of microprocessor cycles.

The amount of data that is displayed on the screen, for example, the number of lines, is kept to a minimum since, as the data is changed, the length of time necessary to rebuild the image in the display format buffer by decoding the vector formatted data in the display data area increases in direct proportion. Thus, if only one record is being displayed, a change in data which could be caused for example by segmenting, appears almost instantly on the screen. However, the time required for new segments to appear increases noticeably as the number of lines being displayed increases. For a relatively few lines, such as three, the operator perceives only a small delay. However, as each additional line thereafter is added, the increase in buffer rebuilding time and, hence, the time that the screen remains blank, begins to be perceptible to the operator and increases proportionally to the number of lines displayed on the screen.

Where the number of field dependent record selection criteria exceeds the predetermined number of displayed rows, an additional blank row is required to be added to the display on the screen for each additional criterion. The operator should not be required to learn a new series of steps to enter each additional criterion when the number of field independent selection criteria required exceeds the number of rows initially displayed. Systems presently known in the art such as that described in the referenced article by Zloof require the operator to learn new steps to add additional criteria. The system to be described does not require the operator to learn new steps, but the system provides the required interactive stimulus, i.e., a new blank row, to the operator so as to remind the operator that changes in the system's response time should be expected when the data format buffer has to be rebuilt, such as when the screen segments itself to show new data.

SUMMARY OF THE INVENTION

In accordance with the present invention, an interactive text processing system displays a qualifying frame to the operator. The qualifying frame comprises a predetermined number of rows, e.g., 3, each of which can be segmented to display all fields of the record. A field dependent selection criterion is entered into each row that is initially displayed by positioning the cursor to the field in the first row, cursoring down to the second row to the appropriate field, and again cursoring down to the appropriate field in the third row.

Additional selection criteria are entered into the system by the operator by merely operating the cursor down key to display another row which will receive the next selection criterion. Additional rows are added by the same procedure until a maximum, e.g., 12, are displayed.

The system captures the entered selection criterion and determines the column position of the entered criterion from the cursor position.

The criteria which appear in different rows of the qualifying frame are "logically ORed" for the selection process, while criteria appearing in the same row are "logically ANDed" for the selection process. The system selects records based on criteria in the corresponding fields which compare equal, or may also be arranged to select records for relationships other than a compare equal relationship. Selected records may be merely counted, displayed to the operator, or copied as part of a new file.

It is, therefore, an object of the present invention to provide in an interactive text processing system having a file of records representing spatially related data, a method of displaying to the operator the header portion of an existing file to permit entry of selection criteria at cursor identified row and column locations.

A still further object of the present invention is to provide an improved method which allows the operator of an interactive text processing system to specify additional selection criteria interactively to the system which will be used by the system to select predetermined records of spatially related data from an existing file stored in a vector format in the system.

The foregoing and other objects, features and advantages of the invention will be apparent from the following more particular description of a preferred embodiment of the invention as illustrated in the accompanying drawings.

DESCRIPTION OF THE INVENTION

The improved method of the present invention will be described as embodied in a conventional text processing system, represented by the functional block system diagram shown in FIGS. 1–4. The description will not involve the details of the conventional text processing system, other than the functional aspects of such a system necessary to an understanding of the present invention. The description likewise will not involve the hardware or program details of the microprocessor other than those aspects necessary to understand a programmed implementation of the improved method of a microprocessor.

Figure 1:
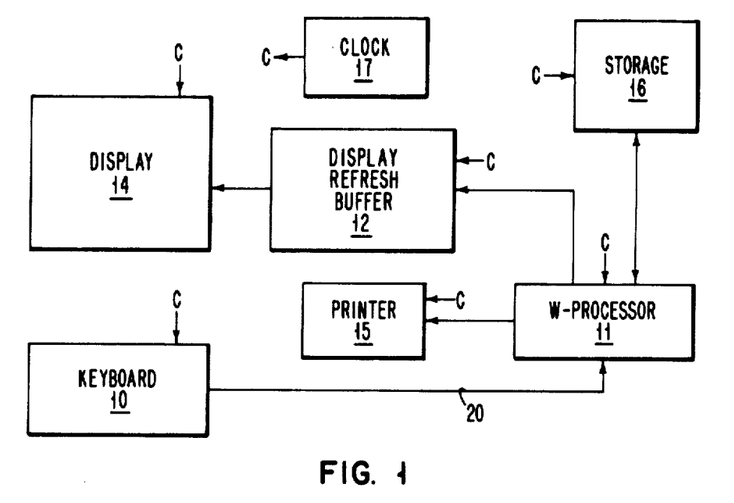
FIG. 1 is a block diagram of an interactive text processing system embodying the present invention.

With reference to the drawings, and particularly to FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
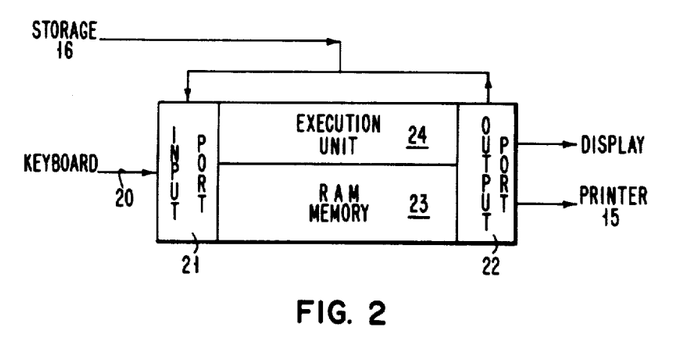
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
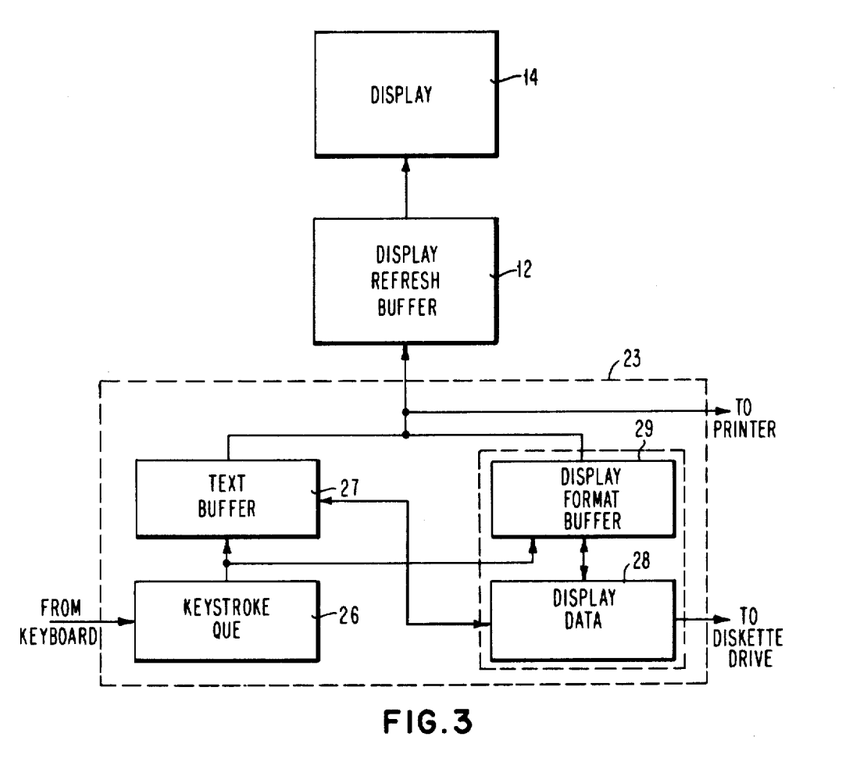
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke queue 26. Data to be displayed is transferred by a series of instructions from queue 26 to the text buffer section 27 and then to the display refresh buffer 12 through output port 22 of the microprocessor. This is achieved in a conventional way by the microprocessor executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor by the operator from the keyboard 10.

Printer 15 may be any suitable printer known in the art. In most text processing systems, the printer is basically a standard output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form in accordance with the method of the invention described in Ser. No. 264,368.

Figure 4:
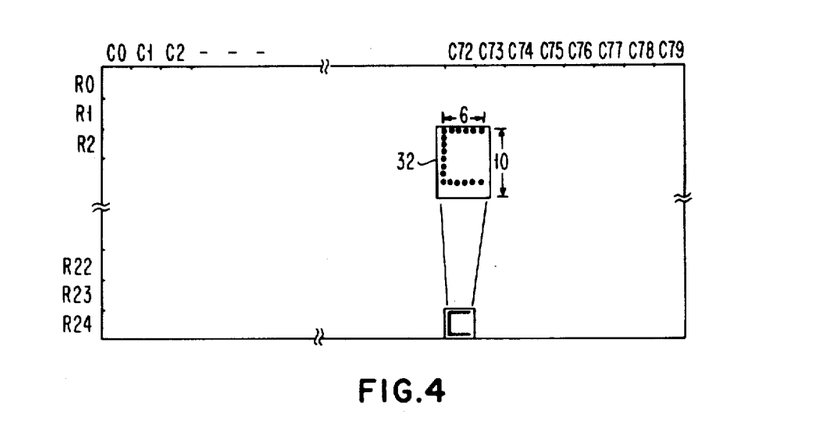
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor are achieved through suitable programs which are also stored in memory 23 and which are called into operation in response to data from the keyboard 10 or interrupt signals generated by the various components of the system shown in FIG. 1.

It will be assumed that the system shown in FIG. 1 corresponds to the system shown and described in the copending application Ser. No. 264,368, filed concurrently herewith and assigned to the assignee of the present invention and that the system has stored therein spatially related data in the form of the following file description:

TABLE 1

| | Existing File | |
|---|---|---|
| | | FILE NAME - PATENT |
| Col. | 0 | Rec. ID |
| | 1 | Pat. No. |
| | 2 | Issue Date |
| | 3 | Serial No. |
| | 4 | Filing Date |
| | 5 | Assignee |

TABLE 1-continued

| | Existing File |
|---|---|
| | FILE NAME - PATENT |
| 6 | 1st Inventor |
| 7 | 2nd Inventor |
| 8 | 3rd Inventor |
| 9 | 4th Inventor |
| 10 | 5th Inventor |
| 11 | Priority Country |
| 12 | P.O. Class OR |
| 13 | P.O. Class XR.1 |
| 14 | P.O. Class XR.2 |
| 15 | P.O. Class XR.3 |
| 16 | P.O. Class XR.4 |

It will be further be assumed that the file is stored in a compressed vector format on the diskette and that records are transferred from the diskette to the display data area where the record is stored in the expanded vector format. It will also be assumed, as previously described, that a "slice" of the row vector is decoded and transferred to the display format buffer in the manner described in the abovementioned copending application.

The present description will be limited to an explanation of how the qualifying frame "segments" to accommodate records having a length greater than 80 character positions and how selection criteria are added to further qualify records in the file when needed. The identified related copending applications should be referred to for an understanding of the details of the basic system.

It will be assumed that the operator's task is to identify each record in the patent file that is either (1) assigned to IBM or invented by either (2) Craver, (3) Jones or (4) Patrick.

Figure 5:
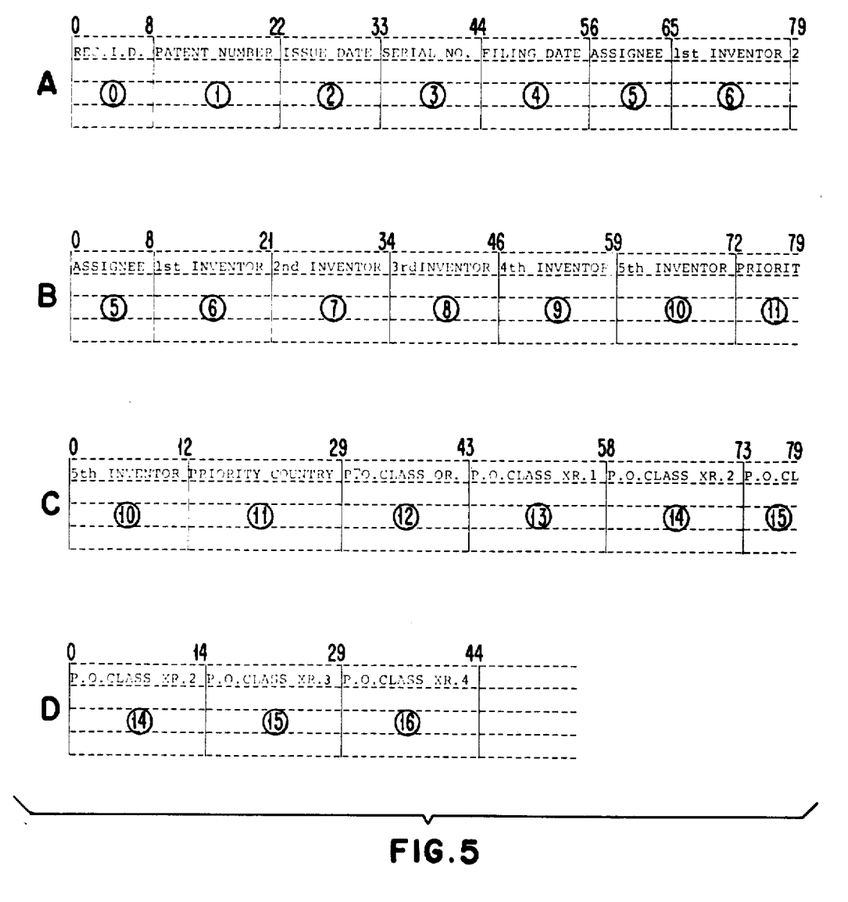
FIGS. 5a through 5d illustrate a segmented qualifying frame for a file of spatially related data that is stored in the system.

As shown in Table 1, each record of the file has 17 separate fields. Fields 0-6 require substantially 80 character positions on the display screen so that 7-17 are not displayed to the operator when the header and the three qualifying rows are initially placed on the screen, as shown in FIG. 5a. The vector data representing the header is, however, stored in the display data area, but only the data representing the first six fields is decoded and transferred to the display format buffer. Segment B of the file shown in FIG. 5b, as comprising fields 5 through 10, would be displayed to the operator when the cursor encountered a predetermined character position in the initial frame, as shown in FIG. 5a. As shown, segment B starts at the beginning of field 5, so that fields 5 and 6 of segment A are actually repeated at the beginning of segment B. A similar situation occurs in segments B, C and D as the cursor is positioned near the end of the segment. Each time the display "segments," the header and the displayed qualifying rows also "segment." As mentioned earlier, the segmenting process involves rebuilding the display format buffer by decoding the appropriate portion of the row vectors stored in the display data area. During the rebuilding process, the screen is blank.

Figure 6:
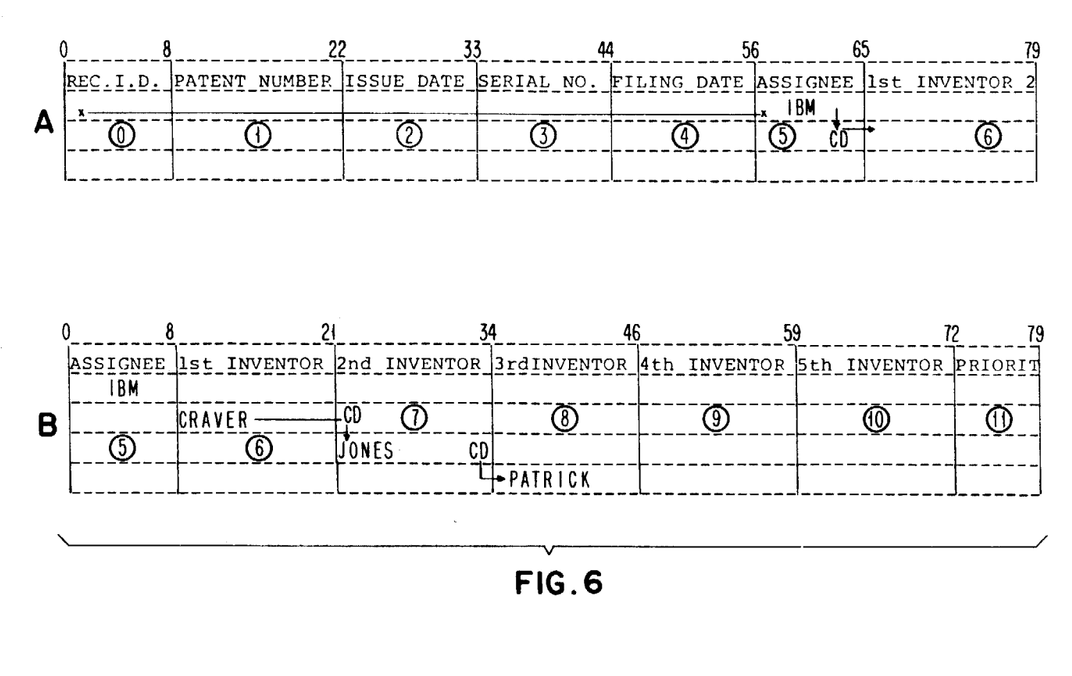
FIGS. 6a through 6b illustrate the entry of four selection criteria to the qualifying frame shown in FIGS. 5a through 5d.
Figure 7:
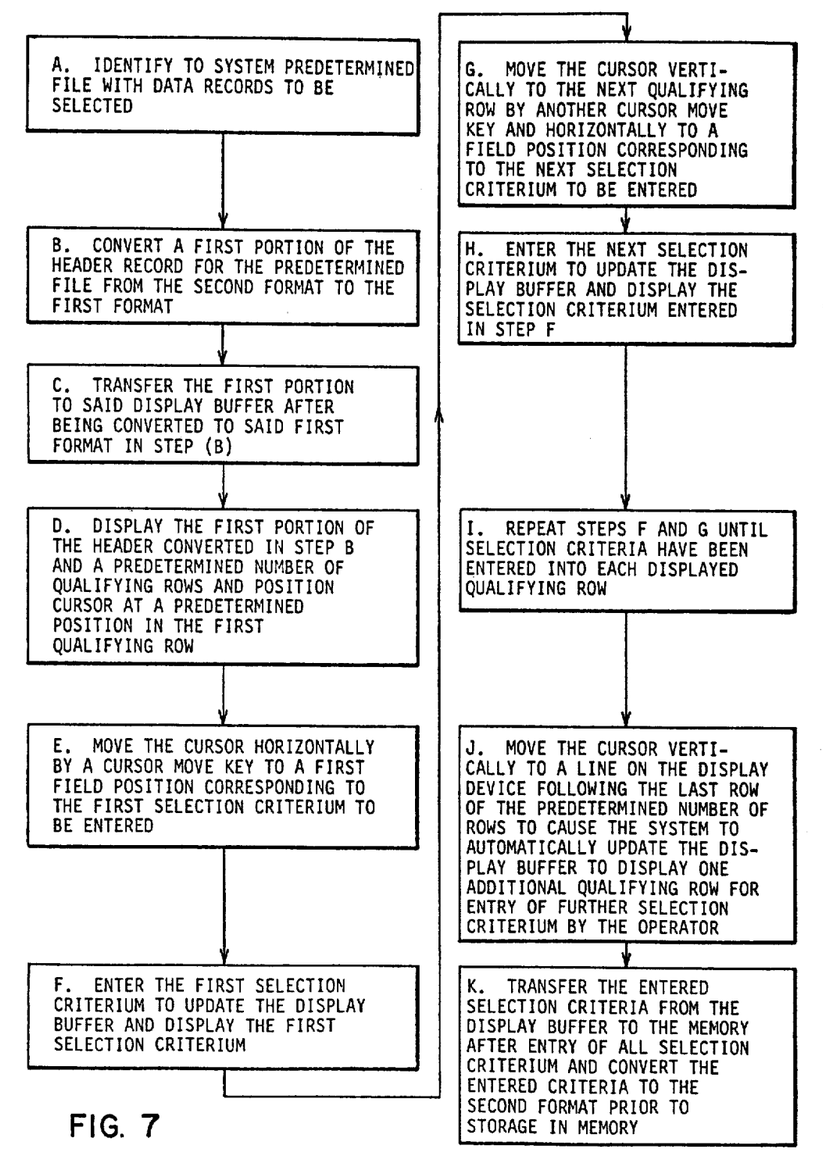
FIG. 7 is a flow chart summarizing the steps of applicants' improved method.

FIGS. 6a and 6b illustrate the qualifying frame as it would be displayed to the operator in response to the operator having selected the task of qualifying records in the Patent file for the purpose of identifying records with the indicated criteria. It should be noted that the qualifying frame shown in FIGS. 6a and 6b is displayed to the operator in response to selecting various tasks which may or may not involve displaying selected records to the operator. The function of the qualifying frame is similar, and the manner in which the selection criteria are entered into the system by the operator is the same for both situations.

As shown in FIG. 6a, the system automatically displays three qualifying rows under the header frame. The cursor is positioned in the first row, first field, first character position. Since the operator, under the assumed conditions, is interested in selecting all records where the assignee is equal to IBM, the operator enters the selection criterion "IBM" in the assignee field by first moving the cursor horizontally in the first row until the "assignee" field is reached. The cursor "next field" key, when operated, moves the cursor from one field to the next in one move. At the assignee field, the criterion "IBM" is entered and displayed to the operator. The cursor is moved to the next row by the operator operating the "cursor down" key. The cursor is then positioned to the 6th field in row 2 by again operating the cursor "next field" key. At that point it is assumed that the display FIG. 6a "segments" and FIG. 6b is then displayed to the operator where field 5 is positioned at the beginning of the segment and the cursor is positioned at field 6. The criterion "Craver" is entered and displayed in row 2, field 6. The cursor "down" key is again actuated and then the move right key, so that the cursor is positioned in row 3 field 7. The operator then enters "Jones" as the third criterion which is displayed.

Meanwhile the system has been tracking cursor movement so that the various selection criteria that have been entered are stored in the system and related to the appropriate field, which has also been stored in the system. The position of the cursor is converted by the system to a column number in a vector format.

Since the operator must add one additional selection criterion, the system will interpret a movement of the cursor from the third row vertically down to where a fourth row would exist as a request by the operator to provide a fourth row for entry of the fourth selection criterion. FIG. 6b shows the additional fourth row which permits the operator to enter the fourth criterion, "Patrick", into field number 8. It is this simple step in the selection process, e.g., operating the "cursor down" key that makes the addition of another selection criterion less complex than prior art systems. The different visual appearance of the display also serves to remind the operator that response time to changes such as horizontal scrolling to view additional segments of the record and header will also be increased.

The system then is instructed to proceed with an identification or selection of those records which meet any of the entered selection criteria.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure as a Letters Patent is:

1. In an interactive text processing system having a display device, a keyboard and a microprocessor including a memory for storing (1) programs; (2) conventional text data in one format; and (3) files of spatially related text type data in second format, where each said file of said spatially related text type data comprises a plurality of vector formatted multi-field records including one header record for defining each of said fields, and a plurality of data records and where said display device includes a display screen having a cursor positionable by cursor move keys on said keyboard and a display format buffer for storing displayed data in said first format while said data is displayed on said screen and where a predetermined portion of a vector formatted record stored in said memory in said second format is converted from said second format to said first format prior to transfer to said display device for display as a line of text data on said screen and reconverted from said first format to said second format after transfer from said display device back to said memory for storage, an improved method for interactively entering field related selection criteria into said system to permit said system to identify each said data record in said predetermined file which meets said entered selection criteria, said method comprising the steps of:

(a) entering into said system through said keyboard an indication of said predetermined file from which said system is to identify said data records in accordance with said selection criteria to be entered by said operator;

(b) converting a first portion of said header record for said predetermined file identified in step (a) from said second format to said first format;

(c) transferring said first portion to said display buffer after being converted to said first format in step (b);

(d) displaying on said display device said first portion of said header record that was converted in step (b) and a predetermined number of qualifying rows with said cursor positioned at a predetermined position in the first row of said qualifying rows;

(e) moving said cursor horizontally by operation of one of said cursor move keys from said predetermined position established in step (d) to a first field position corresponding to the first said selection criterium to be entered;

(f) entering said first selection criterium through said keyboard into said system to update said display buffer to also display said first selection criterium in said first row;

(g) moving said cursor vertically to the next said qualifying row by operation of another said cursor move key and horizontally in said next said qualifying row by said one key to a next said field position corresponding to the next said selection criterium to be entered;

(h) entering said next said selection criterium through said keyboard into said system to update said display buffer to also display said next said selection criterium entered in said next said qualifying row;

(i) repeating steps (g) and (h) until said selection criteria have been entered into each of said displayed predetermined number of qualifying rows;

(j) activating said another said cursor move key to move said cursor vertically to a line on said display device following the last said row of said predetermined number of rows to cause said system to automatically update said display buffer to display one additional qualifying row for entry of further selection criterium by said operator; and (k) transferring said entered selection criteria from said display buffer to said memory after entry of all said selection criteria including the step of converting said entered criteria to said second format prior to storage in said memory;

to permit said system to identify each said record in said predetermined file by comparing each said entered criterium with the data stored in the corresponding field of each said record.

2. The method recited in claim 1 in which said header record has a number of character positions which is greater than the maximum number of characters that can be displayed on one horizontal line of said display device further including the step of:

"segmenting" said header record and said qualifying rows automatically in response to said moving of said cursor horizontally by said operator to a predetermined horizontal position on said screen.

3. The method recited in claim 2 in which said step of "segmenting" said header record and said qualifying rows requires additional processing time for each said one additional row added to said display.

4. The method recited in claim 2 in which said step of "segmenting" includes the steps of:

reconverting the data in said format buffer from said first format to said second format for storage in said memory; and rebuilding said display buffer by converting said second portion of said header from said second format to said first format for display along with the same number of said qualifying rows that were previously displayed prior to said "segmenting" step.

5. The method recited in claim 2 in which said step j is inoperative to add any additional qualifying rows to said display after twelve said qualifying rows are displayed.

6. The method recited in claim 4 further including the step of:

horizontally moving said cursor from either said first field position or said next field position after entry of one criterium to a second field position in said same row for entry of another different said selection criterium.

* * * * *

UNITED STATES PATENT OFFICE
CERTIFICATE OF CORRECTION

Patent No. 4,434,475          Dated  February 28, 1984

Inventor(s)  R. A. McCaskill et al

It is certified that error appears in the above-identified patent and that said Letters Patent are hereby corrected as shown below:

Column 12, line 13, "4" should be --5--.

Signed and Sealed this

Nineteenth Day of June 1984

[SEAL]

Attest:

Attesting Officer

GERALD J. MOSSINGHOFF

Commissioner of Patents and Trademarks